United States Patent
Nurmi et al.

(10) Patent No.: US 7,374,424 B1
(45) Date of Patent: May 20, 2008

(54) HINGE WITH OPTICAL SIGNAL CONDUIT AND ELECTRICAL CONNECTION

(75) Inventors: Juha Nurmi, Salo (FI); Jussi Koskela, Kaarina (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/639,404

(22) Filed: Dec. 14, 2006

(51) Int. Cl.
*H01R 39/00* (2006.01)

(52) U.S. Cl. .......................... 439/31; 439/577
(58) Field of Classification Search ............ 439/31, 439/32, 577; 385/8, 53, 146, 147, 15
See application file for complete search history.

(56) References Cited

U.S. PATENT DOCUMENTS

| | | | | |
|---|---|---|---|---|
| 5,917,968 A | * | 6/1999 | Wood ........................ | 385/15 |
| 5,949,565 A | * | 9/1999 | Ishida ........................ | 398/131 |
| 6,470,132 B1 | * | 10/2002 | Nousiainen et al. ........ | 385/146 |
| 2007/0032275 A1 | * | 2/2007 | Suzuki et al. ............. | 455/575.3 |

* cited by examiner

*Primary Examiner*—Neil Abrams
(74) *Attorney, Agent, or Firm*—Ware, Freesola, Van Der Sluys and Adolphson, LLP

(57) ABSTRACT

A hinge has two hinge parts for connecting two device parts of a portable device. The hinge parts can be moved relative to each other so as to allow the portable device to operate in a number of positions. For example, in a mobile phone with a sliding cover to expose the phone keyboard when the mobile phone is operated in an open position, the hinge parts are also configured to allow the sliding motion of the sliding cover. Furthermore, electrically conductive segments are provided on the hinge parts so that electrical contacts between the device parts can be achieved when the portable device is operated in different positions. Additionally, an optical conduit is provided through the hinge so that optical signals can be conveyed between the device parts when the portable device is operated in different positions.

20 Claims, 9 Drawing Sheets

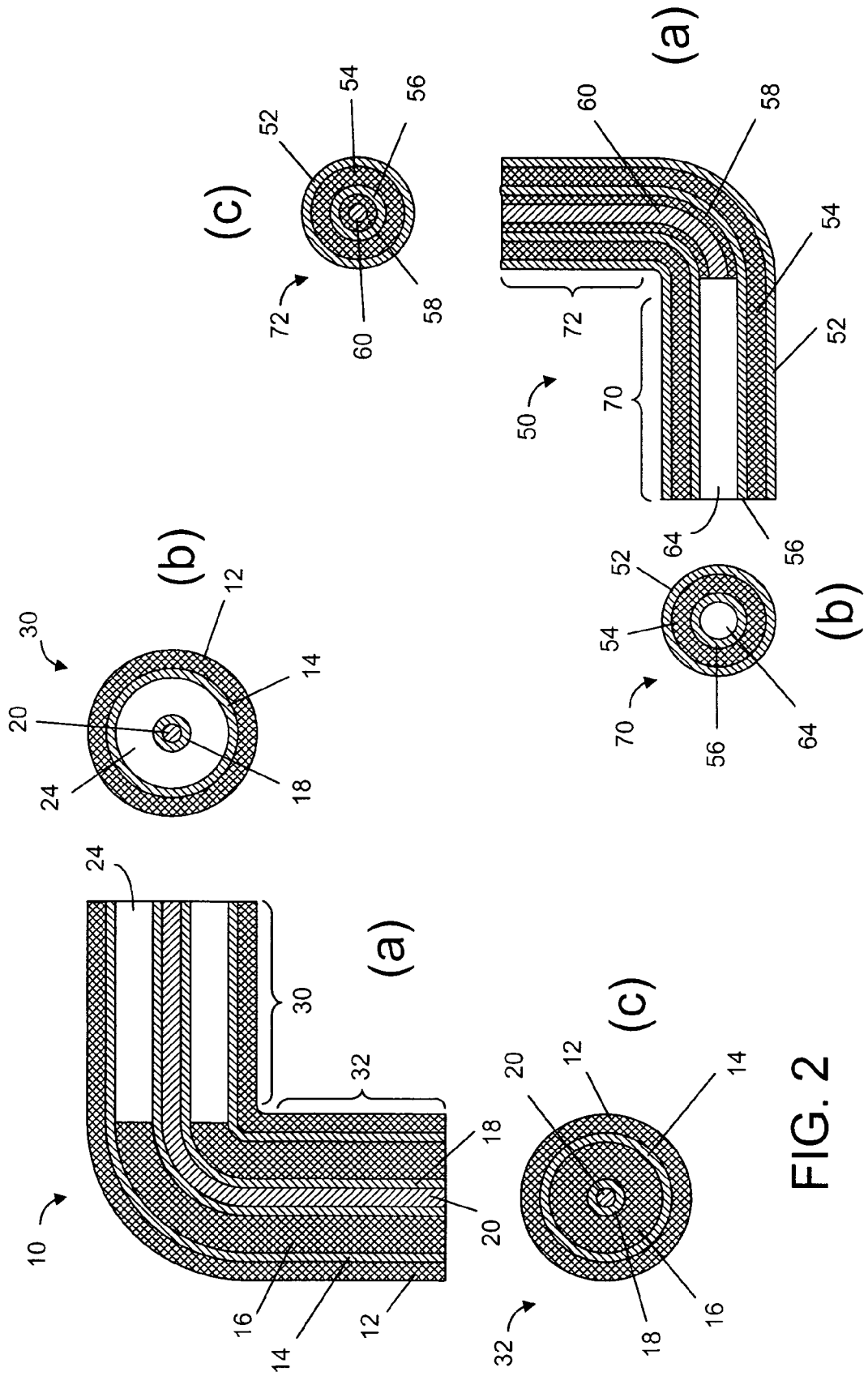

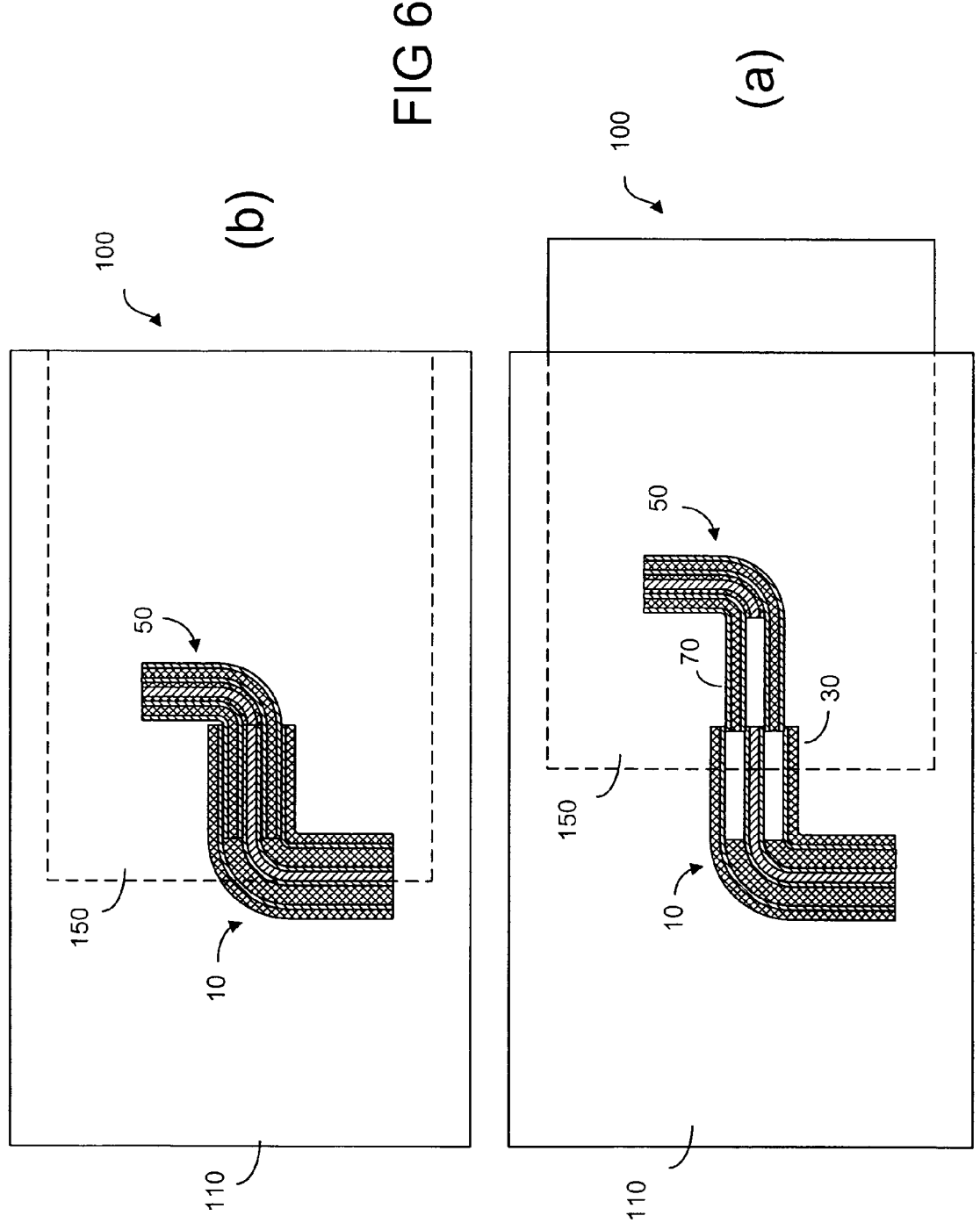

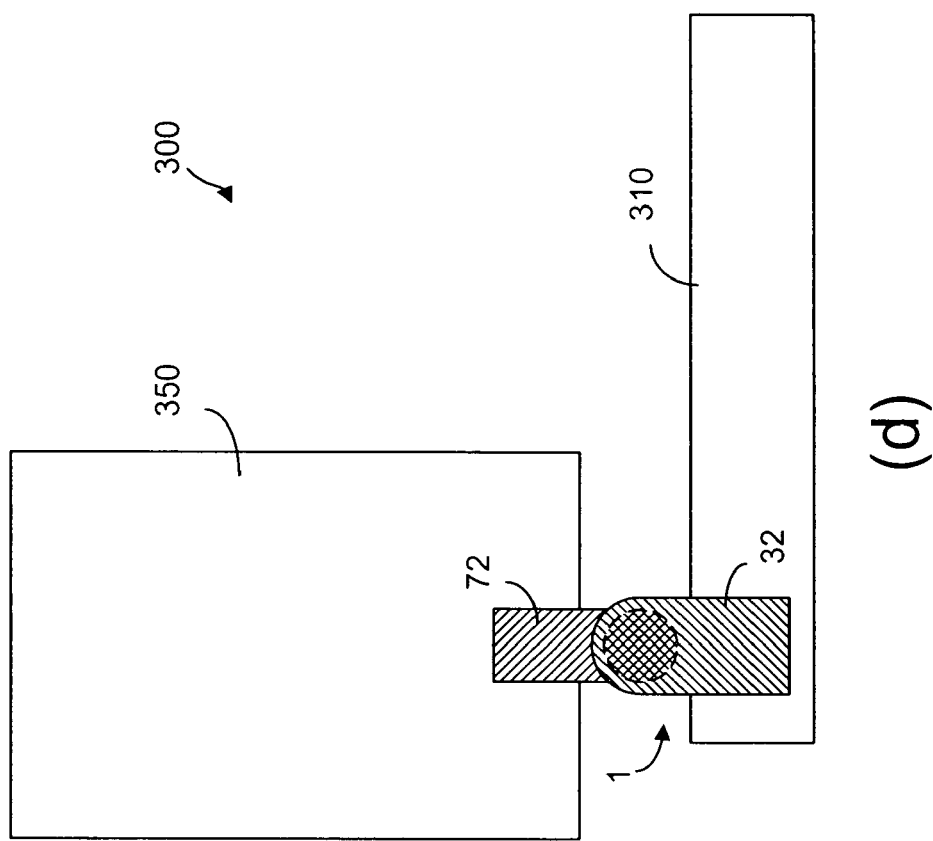
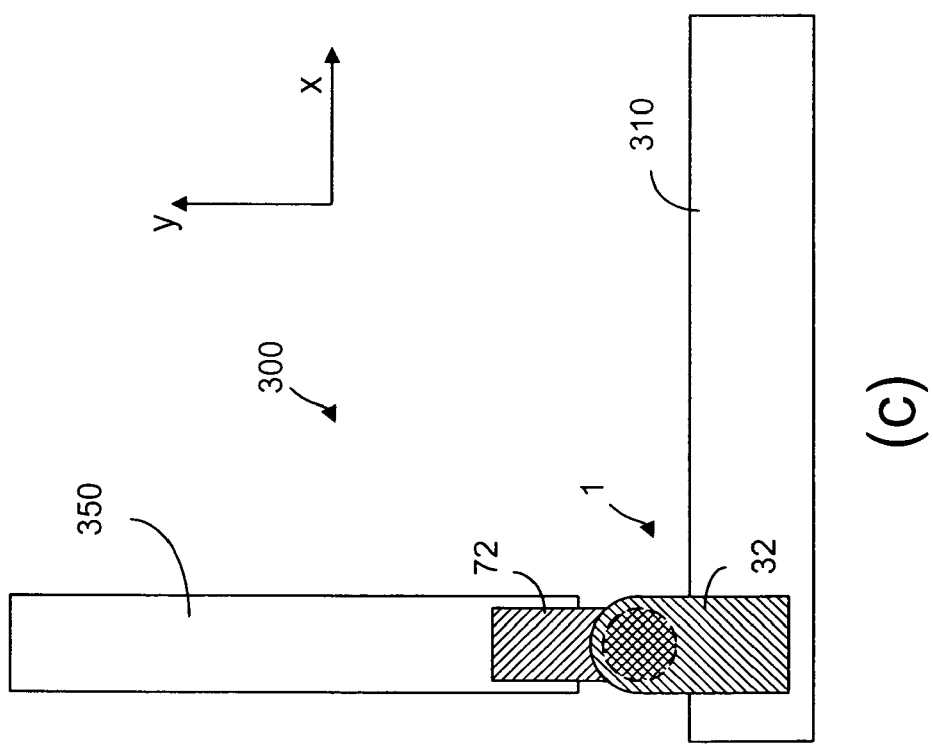
FIG. 9

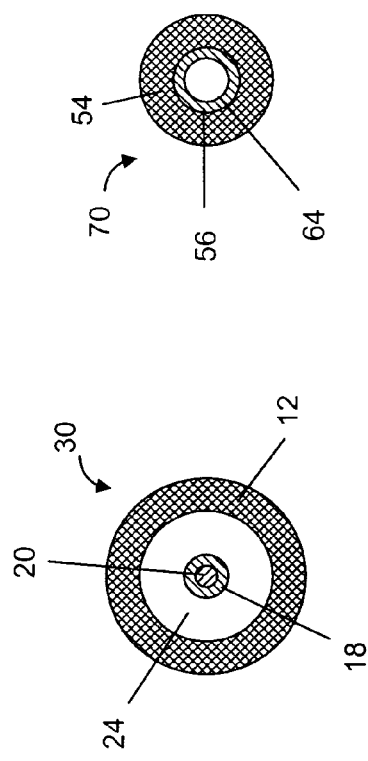
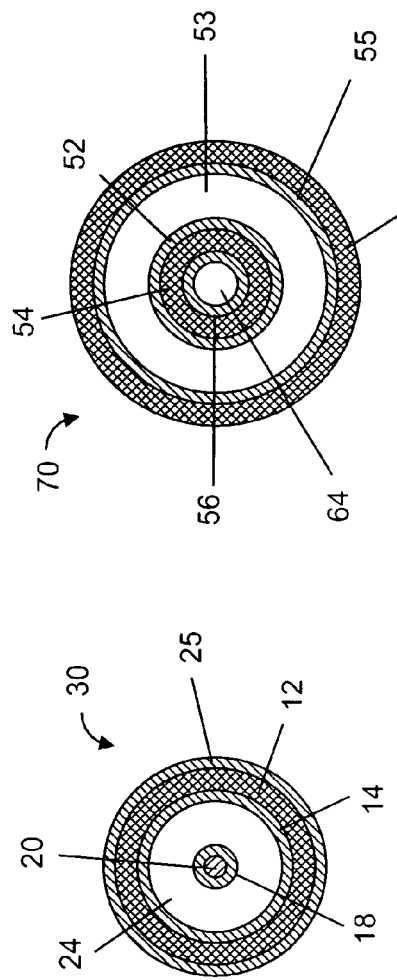
FIG. 10
FIG. 11

HINGE WITH OPTICAL SIGNAL CONDUIT AND ELECTRICAL CONNECTION

FIELD OF THE INVENTION

The present invention relates generally to a hinge for connecting two device parts and, in particular, to a hinge that can be used to transmit optical signals and electrical power from one device part to another part.

BACKGROUND OF THE INVENTION

A portable device, such as a mobile phone, may have two device parts interconnected by a hinge. It is advantageous to have an optical conduit within the hinge for transmitting optical signals between the device parts. In general, optical signals must be converted into electrical signals and, therefore, electrical powers are generally needed in both device parts. Thus, it is also advantageous to convey electrical power or signals from one device part to another through the hinge.

SUMMARY OF THE INVENTION

The present invention provides a hinge having two hinge parts for connecting two device parts of a portable device. The hinge parts can be moved relative to each other so as to allow the portable device to operate in a number of positions. For example, in a mobile phone with a sliding cover to expose the phone keyboard when the mobile phone is operated in an open position, the hinge parts are also configured to allow the sliding motion of the sliding cover. Furthermore, electrically conductive segments are provided on the hinge parts so that electrical contacts between the device parts can be achieved when the portable device is operated in different positions. Additionally, an optical conduit is provided through the hinge so that optical signals can be conveyed between the device parts when the portable device is operated in different positions.

Thus, the first aspect of the present invention is a hinge comprising:

a first hinge part having a first coupling section, the first coupling section having at least a section body with a constant cross section; and a second hinge part having a second coupling section, the second coupling section having at least a section body with a constant cross section, dimensioned for mechanically engaging with the first coupling section such that the first and second coupling sections are slidable against one another to provide at least a first mechanical coupling position and a second mechanical coupling position while the first and section coupling sections remain engaged with one another, wherein the first coupling section comprises a first electrically conductive layer, a second electrically conductive layer and a first optical conduit; and the second coupling section comprises a first electrical conductive segment, a second electrical conductive segment and a second optical conduit, and wherein the first electrically conductive layer is in electrical contact with the first electrical conductive segment when the first and second coupling sections are in the first mechanical coupling position and in the second mechanical coupling position;

the second electrically conductive layer is in electrical contact with the second electrical conductive segment when the first and second coupling sections are in the first mechanical coupling position and in the second mechanical coupling position; and the first optical conduit is positioned relative to the second optical conduit for conveying optical signals, when the first and second coupling sections are in the first mechanical coupling position and in the second mechanical coupling position.

According to one embodiment of the present invention, the cross section of the first coupling section is circular and the cross section of the second coupling section is circular.

At least part of the first optical conduit is located substantially in a center section of the cross section of the first coupling section and at least part of the second optical conduit is located substantially in a center section of the cross section of the second coupling section.

According to one embodiment of the present invention, the first electrically conductive layer is disposed around the first optical conduit, the first electrically conductive layer having an outer diameter and the first electrically conductive segment is disposed in the section body of the second coupling section, the first electrically conductive segment having an inner diameter dimensioned to match the outer diameter of the first electrically conductive layer.

The second electrically conductive layer is disposed around and spaced from the first electrically conductive layer, the second electrically conductive layer having an inner diameter concentric to and greater than the outer diameter of the first electrically conductive layer, defining a concentric air space between the first and second electrically conductive layers, and the second electrically conductive segment is disposed around and spaced from the first electrically conductive segment, the second electrically conductive segment having a further outer diameter concentric to the inner diameter of the first electrically conductive segment, the further outer diameter dimensioned to match the inner diameter of the second electrical conductive layer, so as to allow the second electrically conductive segment and the first electrically conductive segment to reside in at least part of the concentric air space when the first and second coupling sections are in the first and second coupling positions.

Furthermore, an insulation layer is disposed between the first and second electrically conductive segments in the second coupling section, and another insulation layer is disposed outside the second electrically conductive layer of the first coupling section.

In one embodiment of the present invention, the first coupling section has a longitudinal axis, and the first hinge part further comprises a further hinge section fixedly connected to the first coupling section, the further hinge section having a rotational axis substantially perpendicular to the longitudinal axis. Likewise, the second coupling section has a longitudinal axis, and the second hinge part further comprises a further hinge section fixedly connected to the second coupling section, the further hinge section having a rotational axis substantially perpendicular to the longitudinal axis.

The second aspect of the present invention is a portable device, such as a mobile phone, having the hinge with electrical contacts and optical conduits, according to the present invention.

The third aspect of the present invention is a method for providing electrical contacts and optical signals between a first device part and a second device part through a hinge having a first hinge part and a second hinge part, wherein the first device part is mechanically coupled to the first hinge part and the second device part is mechanically coupled to the second hinge part for providing mechanical linkage and relative movement between the first and second device parts. The method comprises:

providing a first coupling section to the first hinge part, the first coupling section having at least a section body with a constant cross section;

providing a second coupling section to the second hinge part, the second coupling section having at least a section body with a constant cross section, dimensioned for mechanically engaging with the first coupling section such that the first and second coupling sections are slidable against one another to provide at least a first mechanical coupling position and a second mechanical coupling position while the first and second coupling sections remain engaged with one another, disposing a first electrically conductive layer, a second electrically conductive layer and a first optical conduit in the first coupling section; and disposing a first electrical conductive segment, a second electrical conductive segment and a second optical conduit in the second coupling section, such that the first electrically conductive layer is in electrical contact with the first electrical conductive segment when the first and second coupling sections are in the first mechanical coupling position and in the second mechanical coupling position;

the second electrically conductive layer is in electrical contact with the second electrical conductive segment when the first and second coupling sections are in the first mechanical coupling position and in the second mechanical coupling position; and the first optical conduit is positioned relative to the second optical conduit for conveying optical signals, when the first and second coupling sections are in the first mechanical coupling position and in the second mechanical coupling position.

According to one embodiment of the present invention, the method further comprises:

positioning at least part of the first optical conduit substantially in a center section of the cross section of the first coupling section;

positioning at least part of the second optical conduit substantially in a center section of the cross section of the second coupling section;

positioning the first electrically conductive layer around the first optical conduit, the first electrically conductive layer having an outer diameter; positioning the first electrically conductive segment in the section body of the second coupling section, the first electrically conductive segment having an inner diameter dimensioned to match the outer diameter of the first electrically conductive layer;

positioning the second electrically conductive layer around and spaced from the first electrically conductive layer, the second electrically conductive layer having an inner diameter concentric to and greater than the outer diameter of the first electrically conductive layer, defining a concentric air space between the first and second electrically conductive layers, and positioning the second electrically conductive segment around and spaced from the first electrically conductive segment, the second electrically conductive segment having a further outer diameter concentric to the inner diameter of the first electrically conductive segment, the further outer diameter dimensioned to match the inner diameter of the second electrical conductive layer, so as to allow the second electrically conductive segment and the first electrically conductive segment to reside in at least part of the concentric air space when the first and second coupling sections are in the first and second coupling positions.

According to one embodiment of the present invention, the method further comprises:

disposing an insulation layer between the first and second electrically conductive segments in the second coupling section; and disposing an insulation layer outside the second electrically conductive layer in the first coupling section.

The present invention will become apparent upon reading the description taken in conjunction with FIGS. 1 to 11b.

BRIEF DESCRIPTION OF THE DRAWINGS

FIGS. 2a to 2c show different views of a first hinge part, according to one embodiment of the present invention.

FIGS. 3a to 3c show different views of a second hinge part, according to one embodiment of the present invention.

FIG. 6a shows a different view of the device parts of FIG. 5 when the device is operated in an open position.

FIG. 6b shows the device of 6a in a closed position.

FIGS. 10a and 10b show a cross sectional view of the connecting sections of a hinge wherein only one electrically conductive connection is provided.

FIGS. 11a and 11b show a cross sectional view of the connecting sections of a hinge wherein three electrically conductive connections are provided.

DETAILED DESCRIPTION OF THE INVENTION

Figure 1:
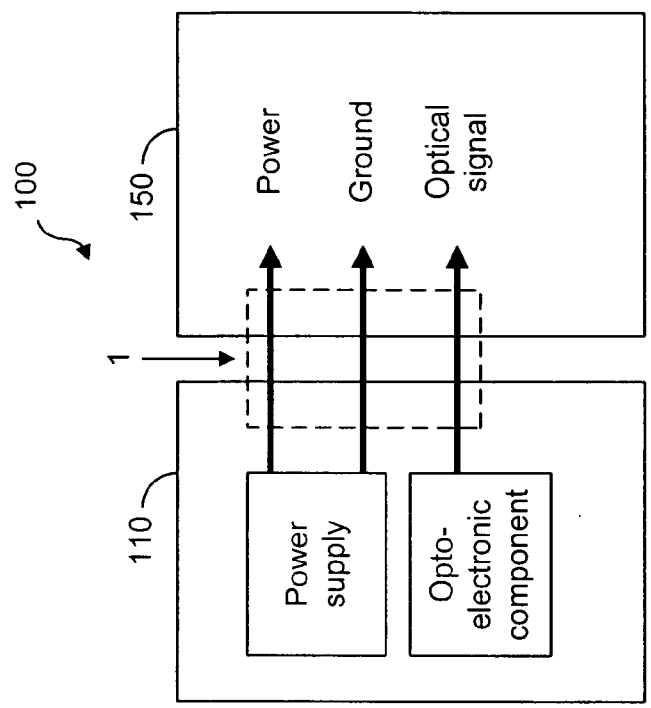
FIG. 1 is a schematic representation of an electronic device having two device parts connected by an optical hinge, according to the present invention.

FIG. 1 is a schematic representation of an electronic device having two device parts connected by an optical hinge, according to the present invention. As shown in FIG. 1, the electronic device 100 has a first device part 110 coupled to a second device part 150 by an optical hinge 1. The optical hinge 1 has an optical conduit for conveying optical signals from the first device part to the second device part. The same conduit can also be used to convey optical signals from the second device part to the first device part. The optical hinge 1 also has electrical conducting parts to provide electrical power from the first device part to the second device part and vice versa.

The optical hinge 1, according to the present invention, has a first hinge part 10 and a second hinge part 50. The first and second hinge parts are dimensioned so that they can slide and rotate against one another. As shown in FIG. 2a, the first hinge part 10 has a connecting section 30 and an anchoring section 32. The anchoring section 32 can be fixedly or movably mounted on the first device part, for example. The connecting section 30 is used for connecting to a connecting section 70 of the second hinge part 50, as shown in FIG. 3a. The second hinge part 50 also has an anchoring section 72. The anchoring section 72 can be fixedly or movably mounted on the second device part, for example. In order to achieve the sliding and rotating motion between the connecting sections 30 and 70, each of the connecting sections 30 and 70 is substantially cylindrical in shape and has a circular cross section, as shown in FIG. 2b and FIG. 3b. The first hinge part 10 has an optical fiber 20 and the second hinge part 50 has an optical fiber 60 located substantially at the center of radius of the corresponding connecting sections in order to convey optical signals when the first and second hinge parts 10 and 50 are engaged with each other. As shown in FIG. 2b, the connecting section 30 has a first cylindrical layer of electrically conductive material 18 surrounding the optical fiber 20. The connecting section 30 also has a second cylindrical layer of electrically conductive material 14 concentrically disposed around the first conductive layer 18, leaving a concentric space 24 between the first and second conductive layers 14 and 18. It is advantageous to have a jacket 12 outside the second conductive layer 14 to keep out dust, for example. The anchoring section 32, as shown in FIG. 2c, is basically the same as the connecting sections 30 except that an insulation layer 16 is used to fill the space between the first and second conductive layers 14 and 18. It should be noted that the cross section of the anchoring section 32 can be circular or in another shape so that the first conductive layer 18 and the second conductive layer 14 can be connected to a printed wire board or a chassis, for example. The optical fiber 20 is operatively connected to an opto-electrical component.

As shown in FIG. 3b, the connecting section 70 has a first cylindrical layer of electrically conductive material 56 and a second cylindrical layer of electrically conductive layer 52. The first conductive layer 56 is basically a cylindrical tube with an inner diameter defining an empty space 64. The inner diameter is substantially equal to the outer diameter of the first conductive layer 18 of the connecting section 30. The second conductive layer 52 is basically a cylindrical tube with an outer diameter substantially equal to the inner diameter of the second conductive layer 14 of the connecting section 30. An insulation layer 54 is provided between the first and second conductive layers 52 and 56. As such, when the first and second hinge parts are engaged with each other, the concentric layers 52, 54 and 56 of connecting section 70 of the second hinge part 50 are inserted into the space 24 of the connecting section 30 of the first hinge part 10, and the optical fiber 20 and the surrounding conductive layer 18 of the connecting section 30 are inserted into the space 64 of the connecting section 70. In the connecting section 70 of the second hinge part 50, the optical fiber 60 is disposed at the end of the empty space 64. When the first and second hinge parts 10 and 50 are engaged with each other, the first conductive layer 56 is in electrical contact with the first conductive layer 18 and the second conductive layer 52 is in electrical contact with the second conductive layer 14 to provide electrical connections between the two hinge parts. Furthermore, optical signals can be conveyed between the optical fiber 60 and the optical fiber 20 whether these optical fibers are in contact with each other. The anchoring section 72, as shown in FIG. 3c, is basically the same as the connecting section 70 except that the inner part of the first conductive layer 56 is filled with the optical fiber 60 and an insulation layer 58. It should be noted that the cross section of the anchoring section 72 can be circular or in another shape so that the first conductive layer 56 and the second conductive layer 52 can be connected to a printed wire board or a chassis, for example. The optical fiber 60 is operatively connected to an opto-electrical component.

Figure 4:
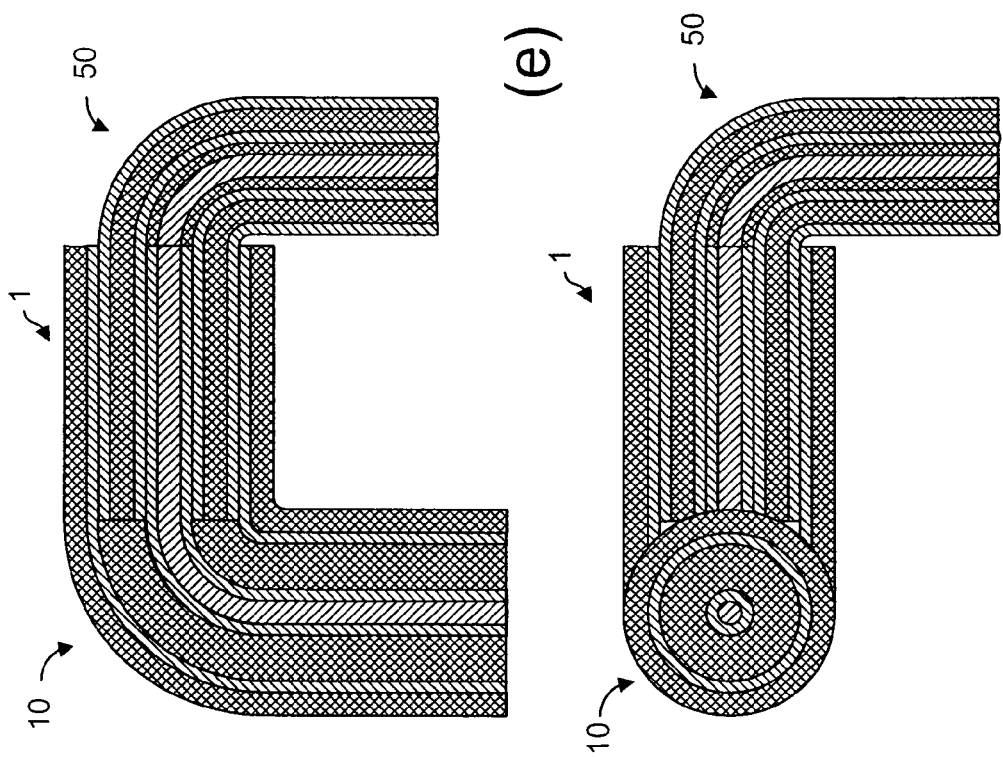
FIGS. 4a to 4f show different operational positions of the optical hinge, according to the present invention.
Figure 4:
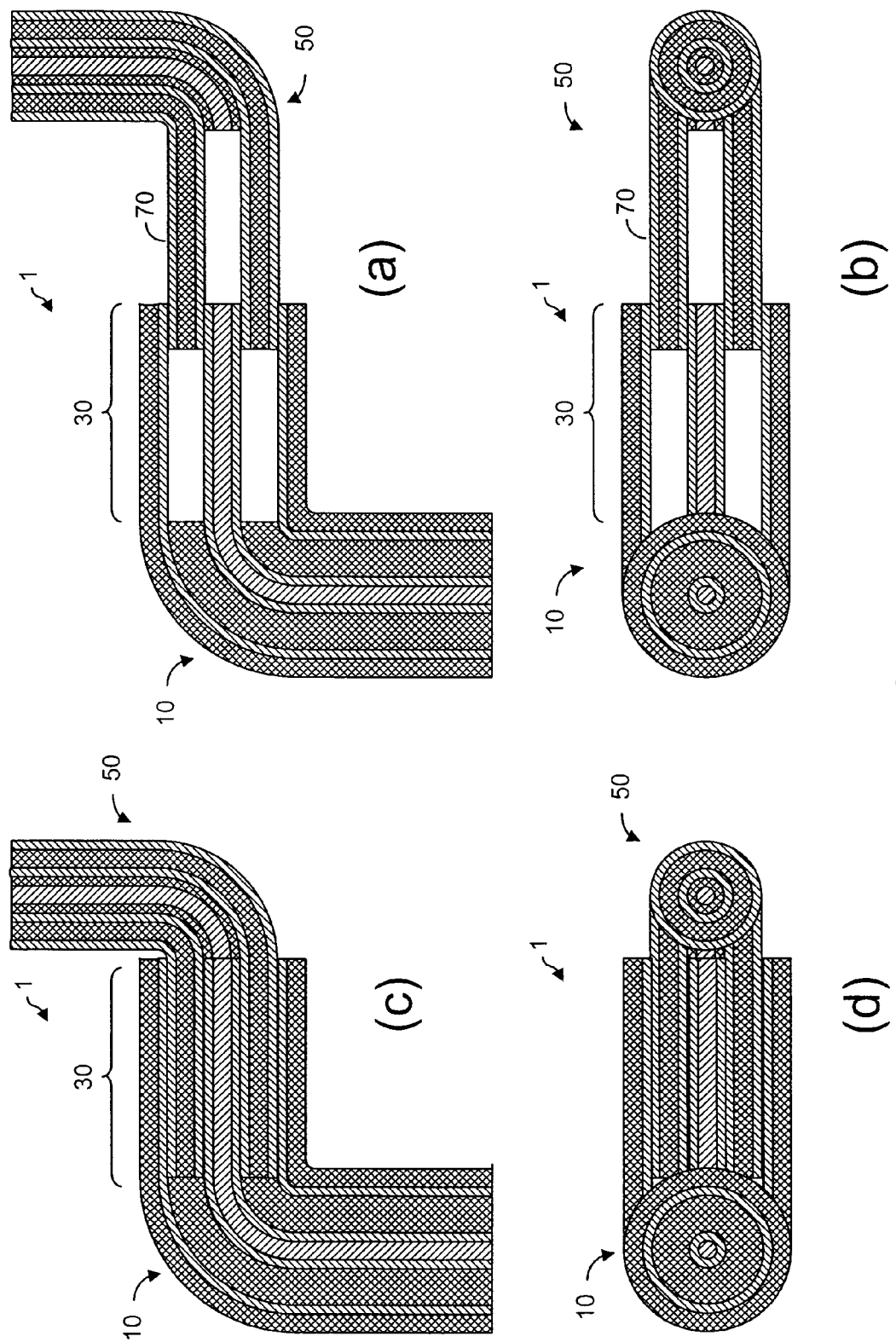
Figure 5:
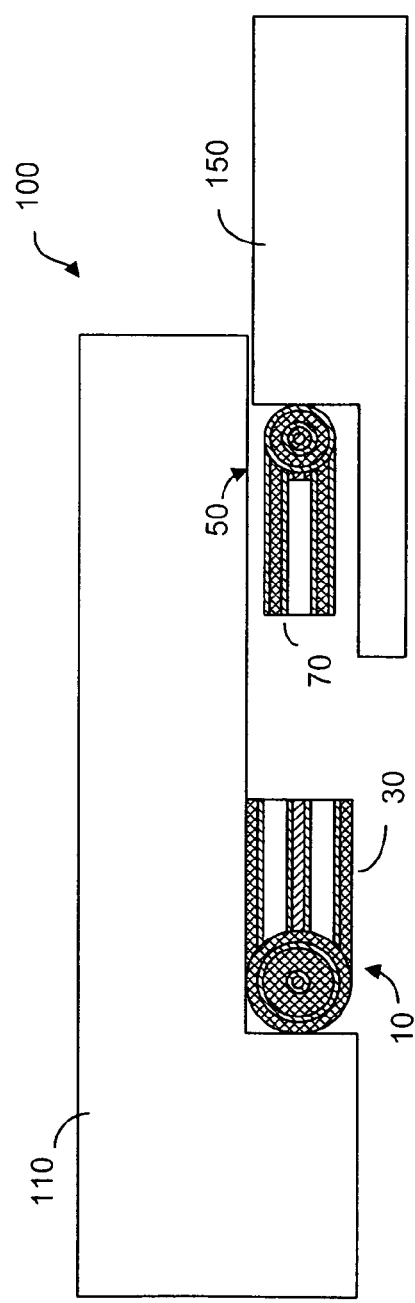
FIG. 5 is a side-view showing two hinge parts separately mounted on two device parts to allow a sliding motion between the device parts.

FIGS. 4a and 4b are different views of the optical hinge 1 when the connecting section 70 of the second hinge part 50 is partially inserted into the connecting section 30 of the first hinge part 10. FIGS. 4c and 4d are different views of the optical hinge 1 when the connecting section 70 of the second hinge part 50 is fully inserted into the connecting section 30 of the first hinge part 10. It should be noted that so long as the connecting section 70 is coupled to the connecting section 30, the electrical contacts between the first hinge part 10 and the second hinge part 50 can be maintained and the optical communications between the first and second hinge parts can also be maintained. The same is true when the first and second hinge parts are rotated against each other, as shown in FIGS. 4e and 4f.

As the optical and electrical conduits can be maintained while the hinge parts undergo sliding motions and rotational motions, the optical hinge 1 can be implemented in many different ways between two device parts. For example, in an electronic device 100 having a first device part 110 and a second device part 150, the entire first hinge part 10 is mounted in an indent section of the first device part 110, and the entire second hinge part 50 is mounted in an indent section of the second part 150. FIG. 6a shows a different view of the electronic device 100 in an open position, and FIG. 6b shows the electronic device 100 in a closed position. When the electronic device 100 is in the open position, the connecting section 70 is only partially inserted in the connecting section 30.

Figure 7:
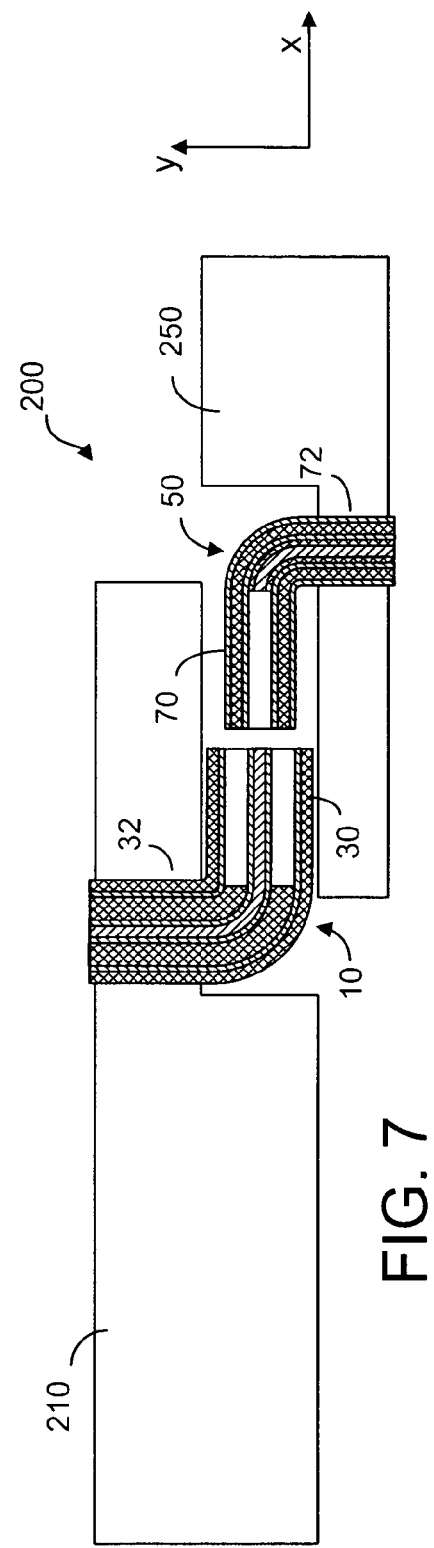
FIG. 7 is a side-view showing a different implementation of the hinge parts on two device parts.

The optical hinge can be implemented on an electronic device in a different way, as shown in FIG. 7. As shown in FIG. 7, the electronic device 200 has a first device part 210 and a second device part 250. The connecting section 30 of the first hinge part 10 is disposed in an indent section of the first device part 210, but the anchoring section 32 is mounted through the device part 210. Likewise, the connecting section 70 of the second hinge part 50 is disposed in an indent section of the second device part 250, but the anchoring section 72 is mounted through the second device part 250. In this configuration, the first hinge part 10 is allowed to rotate along the y axis against the first device part 210 and the second hinge part 50 is allowed to rotate along the y axis against the second device part 250.

Figure 8:
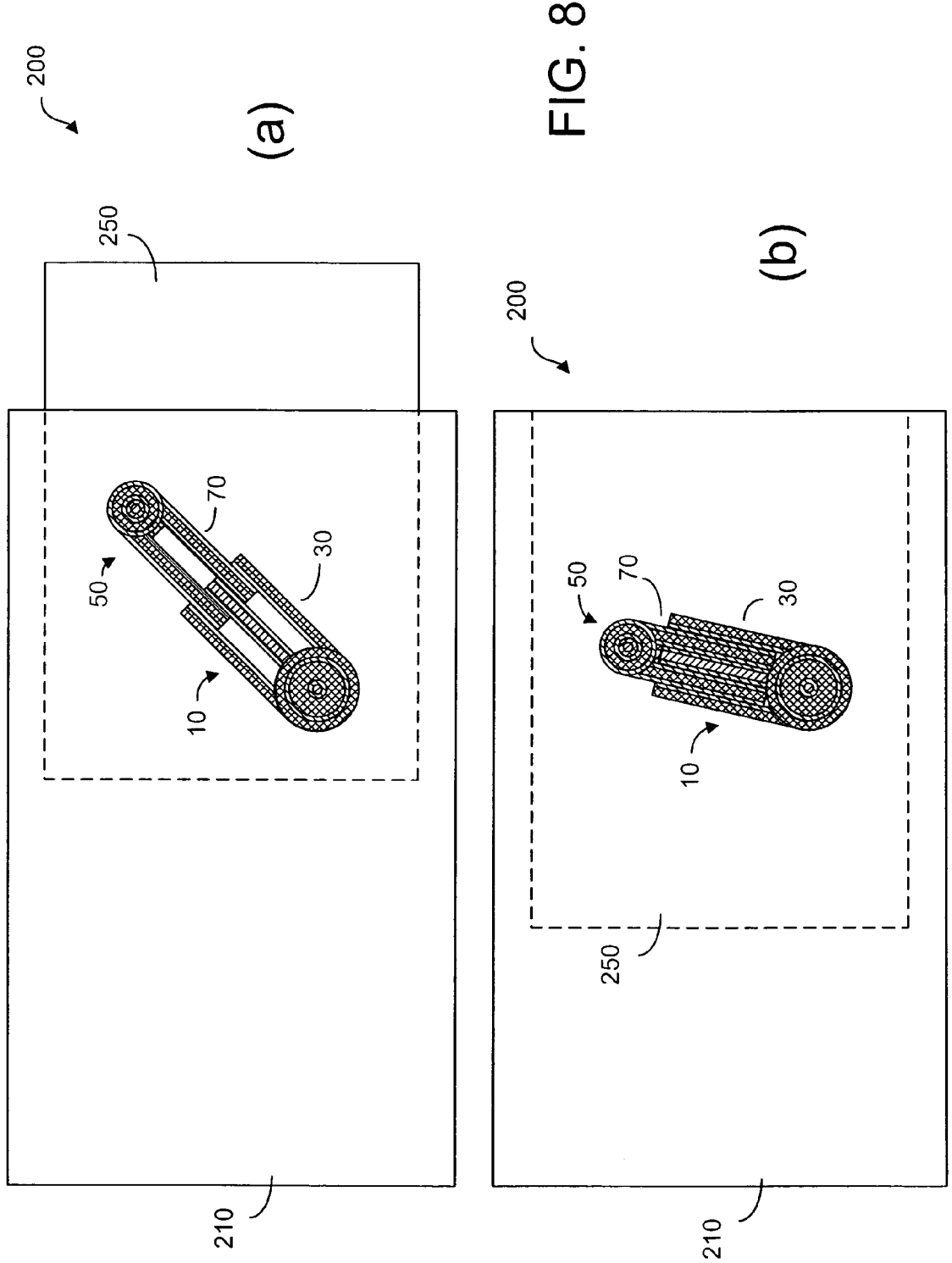
FIG. 8a shows a different view of the device parts of FIG. 7 when the device is operated in an open position.
FIG. 8b shows the device of 8a in a closed position.

FIG. 8a shows a different view of the electronic device 200 in an open position, and FIG. 8b shows the electronic device 200 in a closed position. When the electronic device 200 is in the open position, the connecting section 70 is only partially inserted in the connecting section 30. When the electronic device 200 is in the closed position, the connecting section 70 is further inserted into the connecting section 30. As the same time, both the first hinge part 10 and the second hinge part 50 are rotated in a counter-clockwise direction.

Figure 9:
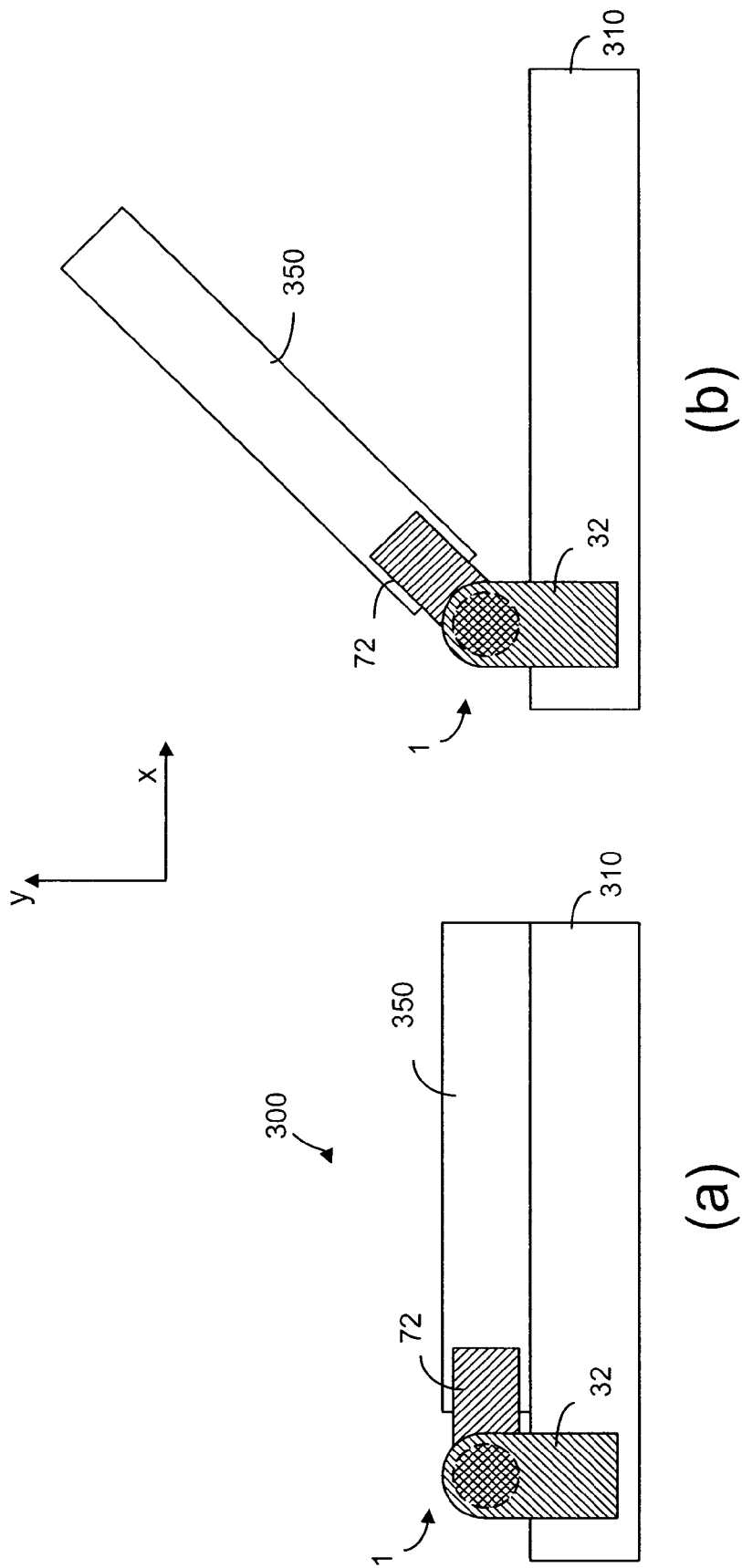
FIGS. 9a to 9d show a clamshell phone having the optical hinge, according to the present invention, wherein one part of the phone can also be rotated along two orthogonal axes.

In an electronic device such as a clamshell phone, the optical hinge can be implemented in yet another different way. As shown in FIGS. 9a to 9d, the electronic device 300 has a first device part 310 and a second device part 350. The anchoring section 32 of the first hinge part is mounted on the first device part 310 depth-wise and the anchoring section 72 of the second hinge part is mounted on the second device part 350 lengthwise. The engaged connecting parts 30 and 70 (see FIGS. 4a and 4b) serve as pivot to allow the second device part 350 to rotate along the z direction (not shown) to open the electronic device 300, from a closed position as shown in FIG. 9a to various open positions as shown in FIGS. 9*b* and 9*c*. Additionally, the second device part 350 can use the anchoring section 72 as pivot to rotate along the y axis, as shown in FIG. 9*d*.

In sum, the optical hinge of the present invention has a first hinge part and a second hinge part. Each of the first and second hinge parts has a connecting section and an anchoring section. The connecting sections can be movably coupled to each other so as to allow one connecting section to slide against the other while maintaining the electrical and optical links. Advantageously, both connecting sections are concentrically constructed so as to allow one connecting section to rotate against the other, in addition to the sliding motion. Each of the connecting sections has a first and a second cylindrical layer of an electrically conductive material. The conductive layers in the first hinge part are dimensioned to provide electrical contacts to the corresponding conductive layers in the second hinge part whether the connecting sections are fully engaged or partially engaged with each other. Each of the first and second hinge parts has a centrally located optical fiber so as to allow optical signals to be conveyed between the first and second hinge parts when the connecting sections are fully or partially engaged. The optical hinge, according to the present invention, can be used as a mechanical coupling means to allow one device part to move relative to another device part. The relative movement can be a sliding motion or a rotational motion.

It should be noted that when the device parts are not required to rotate against one another as illustrated in FIGS. 8*a* to 8*b*, the cross section of connecting sections 30 and 70 is not necessarily circular as depicted in FIGS. 2*b* and 3*b*. The cross section can be elliptical, rectangular or any shape, so long as the cross section is constant over each of the connecting sections. Furthermore, each of the electrically conductive layers 14, 18, 52 and 56 does not necessarily form a complete loop like a tube. Each layer can be one or more elongated segments wide enough to provide electrical contact with its counterpart even when the connecting sections are caused to rotate against one another.

It is possible that there is only one electrically conductive layer in each of the connecting sections 30 and 70. As shown in FIG. 10*a*, the connecting section 30 has only one electrically conductive layer 18. Similarly, the connecting section 70 also has only one electrically conductive layer 56. Moreover, it is also possible that three or more electrically conductive layers are provided in each of the connecting sections 30 and 70. As shown in FIG. 11*a*, the connecting section 30 has an additional electrically conductive layer 25 surrounding the insulation jacket 12. As shown in FIG. 11*b*, the connecting section 70 has a corresponding electrically conductive layer 55 concentrically provided around the inner layers. The inner diameter of third electrically conductive layer 55 is substantially equal to the outer diameter of the electrically conductive layer 25. The concentric space 53 between the electrically conductive layers 52 and 55 in the connecting section 70 allows the layers 25, 12 and 14 of the connecting section 30 to be inserted into the space 53, while the optical fiber 20 and the electrically conductive layer 18 are inserted into the space 64 in the connecting section 70.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A hinge comprising:
a first hinge part having a first coupling section, the first coupling section having at least a section body with a constant cross section; and
a second hinge part having a second coupling section, the second coupling section having at least a section body with a constant cross section, dimensioned for mechanically engaging with the first coupling section such that the first and second coupling sections are slidable against one another to provide at least a first mechanical coupling position and a second mechanical coupling position while the first and section coupling sections remain engaged with one another, wherein
the first coupling section comprises at least one electrically conductive layer and a first optical conduit; and
the second coupling section comprises at least one electrical conductive segment and a second optical conduit, and wherein
the electrically conductive layer is in electrical contact with the electrical conductive segment when the first and second coupling sections are in the first mechanical coupling position and in the second mechanical coupling position; and
the first optical conduit is positioned relative to the second optical conduit for conveying optical signals, when the first and second coupling sections are in the first mechanical coupling position and in the second mechanical coupling position.

2. The hinge of claim 1, wherein
the cross section of the first coupling section is circular and the cross section of the second coupling section is circular.

3. The hinge of claim 2, wherein the first coupling section further comprises a second electrically conductive layer spaced from the electrically conductive layer; and
the second coupling section further comprises a second electrical conductive segment spaced from the electrically conductive segment, and wherein
the second electrically conductive layer is in electrical contact with the second electrical conductive segment when the first and second coupling sections are in the first mechanical coupling position and in the second mechanical coupling position.

4. The hinge of claim 2, wherein at least part of the first optical conduit is located substantially in a center section of the cross section of the first coupling section and at least part of the second optical conduit is located substantially in a center section of the cross section of the second coupling section.

5. The hinge of claim 4, wherein the electrically conductive layer is disposed around the first optical conduit, the electrically conductive layer having an outer diameter and the electrically conductive segment is disposed in the section body of the second coupling section, the electrically conductive segment having an inner diameter dimensioned to match the outer diameter of the electrically conductive layer.

6. The hinge of claim 3, wherein
at least part of the first optical conduit is located substantially in a center section of the cross section of the first coupling section;
at least part of the second optical conduit is located substantially in a center section of the cross section of the second coupling section;
the electrically conductive layer is disposed around the first optical conduit, the electrically conductive layer having an outer diameter; and the electrically conductive segment is disposed in the section body of the second coupling section, the electrically conductive segment having an inner diameter dimensioned to match the outer diameter of the electrically conductive layer, and wherein the second electrically conductive layer is disposed around the electrically conductive layer, the second electrically conductive layer having an inner diameter concentric to and greater than the outer diameter of the electrically conductive layer, defining a concentric air space between the electrically conductive layer and the second electrically conductive layers, and the second electrically conductive segment is disposed around the electrically conductive segment, the second electrically conductive segment having a further outer diameter concentric to the inner diameter of the electrically conductive segment, the further outer diameter dimensioned to match the inner diameter of the second electrical conductive layer, so as to allow the second electrically conductive segment and the electrically conductive segment to reside in at least part of the concentric air space when the first and second coupling sections are in the first and second coupling positions.

7. The hinge of claim 6, wherein the second coupling section further comprises an insulation layer disposed between the electrically conductive layer and the second electrically conductive segments.

8. The hinge of claim 6, wherein the first coupling section further comprises an insulation layer disposed outside the second electrically conductive layer.

9. The hinge of claim 1, wherein the first coupling section has a longitudinal axis, and the first hinge part further comprises a further hinge section fixedly connected to the first coupling section, the further hinge section having a rotational axis substantially perpendicular to the longitudinal axis.

10. The hinge of claim 1, wherein the second coupling section has a longitudinal axis, and the second hinge part further comprises a further hinge section fixedly connected to the second coupling section, the further hinge section having a rotational axis substantially perpendicular to the longitudinal axis.

11. A portable device comprising a first device part and a second device part coupled to the hinge of claim 1, such that the first device part is mechanically coupled to the first hinge part, and the second device part mechanically is coupled to the second hinge part so that the first and second device parts are mechanically coupled to one another and the first and second device parts are movable relative to one another.

12. The portable device of claim 11, wherein the first coupling section in the hinge further comprises a second electrically conductive layer spaced from the electrically conductive layer; and the second coupling section further comprises a second electrical conductive segment spaced from the electrically conductive segment, and wherein the second electrically conductive layer is in electrical contact with the second electrical conductive segment when the first and second coupling sections are in the first mechanical coupling position and in the second mechanical coupling position.

13. The portable device of claim 12, comprising a mobile phone.

14. A method for providing electrical contacts and optical signals between a first device part and a second device part through a hinge having a first hinge part and a second hinge part, wherein first device part is mechanically coupled to the first hinge part and the second device part is mechanically coupled to the second hinge part for providing mechanical linkage and relative movement between the first and second device parts, said method comprising:

providing a first coupling section to the first hinge part, the first coupling section having at least a section body with a constant cross section;

providing a second coupling section to the second hinge part, the second coupling section having at least a section body with a constant cross section, dimensioned for mechanically engaging with the first coupling section such that the first and second coupling sections are slidable against one another to provide at least a first mechanical coupling position and a second mechanical coupling position while the first and section coupling sections remain engaged with one another, disposing at least one electrically conductive layer and a first optical conduit in the first coupling section; and disposing at least one electrical conductive segment and a second optical conduit in the second coupling section, such that the electrically conductive layer is in electrical contact with the electrical conductive segment when the first and second coupling sections are in the first mechanical coupling position and in the second mechanical coupling position; and the first optical conduit is positioned relative to the second optical conduit for conveying optical signals, when the first and second coupling sections are in the first mechanical coupling position and in the second mechanical coupling position.

15. The method of claim 14, further comprising:

positioning at least part of the first optical conduit substantially in a center section of the cross section of the first coupling section; and positioning at least part of the second optical conduit substantially in a center section of the cross section of the second coupling section.

16. The method of claim 14, further comprising:

disposing in the first coupling section a second electrically conductive layer spaced from the electrically conductive layer; and disposing in the second coupling section a second electrical conductive segment spaced from the electrically conductive segment, such that the second electrically conductive layer is in electrical contact with the second electrical conductive segment when the first and second coupling sections are in the first mechanical coupling position and in the second mechanical coupling position.

17. The method of claim 15, further comprising:

positioning the electrically conductive layer around the first optical conduit, the electrically conductive layer having an outer diameter; and positioning the electrically conductive segment in the section body of the second coupling section, the electrically conductive segment having an inner diameter dimensioned to match the outer diameter of the electrically conductive layer.

18. The method of claim 16, further comprising:

positioning the electrically conductive layer around the first optical conduit, the electrically conductive layer having an outer diameter;

positioning the electrically conductive segment in the section body of the second coupling section, the electrically conductive segment having an inner diameter dimensioned to match the outer diameter of the electrically conductive layer;

positioning the second electrically conductive layer around the electrically conductive layer, the second electrically conductive layer having an inner diameter concentric to and greater than the outer diameter of the electrically conductive layer, defining a concentric air space between the electrically conductive layer and second electrically conductive layers; and positioning the second electrically conductive segment around the electrically conductive segment, the second electrically conductive segment having a further outer diameter concentric to the inner diameter of the electrically conductive segment, the further outer diameter dimensioned to match the inner diameter of the second electrical conductive layer, so as to allow the second electrically conductive segment and the electrically conductive segment to reside in at least part of the concentric air space when the first and second coupling sections are in the first and second coupling positions.

19. The method of claim 18, further comprising:

disposing an insulation layer between the electrically conductive layer and second electrically conductive segments in the second coupling section.

20. The method of claim 18, further comprising:

disposing an insulation layer outside the second electrically conductive layer in the first coupling section.

\* \* \* \* \*

UNITED STATES PATENT AND TRADEMARK OFFICE
CERTIFICATE OF CORRECTION

PATENT NO.         : 7,374,424 B1
APPLICATION NO.    : 11/639404
DATED              : May 20, 2008
INVENTOR(S)        : Juha Nurmi et al.

It is certified that error appears in the above-identified patent and that said Letters Patent is hereby corrected as shown below:

In column 10, line 15, claim 14, line 19, "section" should be --second--.

Signed and Sealed this

Nineteenth Day of August, 2008

JON W. DUDAS
*Director of the United States Patent and Trademark Office*